United States Patent [19]

Breen et al.

[11] Patent Number: 5,057,228

[45] Date of Patent: Oct. 15, 1991

[54] METAL ION COMPLEXES FOR USE AS SCALE INHIBITORS

[75] Inventors: Patrick J. Breen, Houston; Hartley H. Downs, Kingwood, both of Tex.; Bruce N. Diel, Willowbrook, Ill.

[73] Assignee: Baker Hughes Incorporated, Houston, Tex.

[21] Appl. No.: 509,911

[22] Filed: Apr. 16, 1990

[51] Int. Cl.$^5$ ................................................. C02F 5/14
[52] U.S. Cl. ..................................... 210/700; 252/180
[58] Field of Search ............................... 210/698–701; 252/180, 181

[56] References Cited

U.S. PATENT DOCUMENTS

| | | | |
|---|---|---|---|
| 3,393,150 | 7/1968 | Ralston | 210/700 |
| 3,547,817 | 12/1970 | Hansene et al. | 210/58 |
| 3,792,084 | 2/1974 | Quinlan | 260/502.5 |
| 3,833,486 | 9/1974 | Nobel et al. | 204/44 |
| 3,867,286 | 2/1975 | Quinlan | 210/58 |
| 4,497,713 | 2/1985 | Geiger | 210/699 |
| 4,663,053 | 5/1987 | Geiger | 210/700 |

FOREIGN PATENT DOCUMENTS 0186990 7/1986 European Pat. Off. .
0256284 2/1988 European Pat. Off. .

OTHER PUBLICATIONS

P. H. Ralston, "Inhibiting Water Formed Deposits with Threshold Compositions," *Materials Performance*, vol. 11, No. 6, (1972) pp. 39–44.
R. J. Motekaitis, et al., "Equilibria of Ethylenediamine-N,N,N',N'-tetrakis(methylenephosphonic) Acid with Cu(II), Ni(II), Co(II), Zn(II), Mg(II), Ca(II), and Fe(III) Ions in Aqueous Solution," *Inorganic Chemistry*, vol. 15, No. 9, 1976, pp. 2303–2306.
M. T. M. Zaki, et al., "Metal Chelates of Phosphonate-Containing Ligands-IV: Stability of Some 1,6-Hexamethylenediamine-N,N,N',N'-Tetra(methylenephosphonic) Acid Metal Chelates," *Talanta*, vol. 27, (1980) pp. 709–713.
B. Spiess, et al., "Complexing Properties of Nitrilotri(methylenephos–phonic) Acid With Various Transition and Heavy Metals in a 10:90 Ethanol–Water Medium," *Polyhedron*, vol. 6, No. 6, (1987) pp. 1247–1249.

*Primary Examiner*—Peter Hruskoci
*Attorney, Agent, or Firm*—Rosenblatt & Associates

[57] ABSTRACT

Complex molecules of phosphonic acid ligands and transition metal ions are formed to be surprisingly good at inhibiting and even preventing scale in aqueous solutions, crude oils, aqueous production fluids, heat exchange media, etc. Ethylenediaminetetra(methylenephosphonic) acid (ENTMP) complexed with copper (II) is a particularly effective scale inhibitor over wide pH and temperature ranges. Other useful metal complex molecules include various alkyleneamino(alkylphosphonic) acids, or salts thereof, complexed with transition metals such as nickel (II), cobalt (II) and zinc (II), in addition to copper (II). The active complexes may be termed phosphonate metal complexes, or in some forms, phosphonic acid metal complexes.

2 Claims, No Drawings

METAL ION COMPLEXES FOR USE AS SCALE INHIBITORS

FIELD OF THE INVENTION

The invention relates to compositions for the elimination or reduction of scale formation and, in one aspect, more particularly relates to metal ion complexes used in the inhibition or elimination of scale in aqueous solutions, crude oil fluids and the like.

BACKGROUND OF THE INVENTION

Scale formation from the precipitation of inorganic chemical species in water has long been a problem. In residential experience, scale typically builds up as hard water deposits in pipes and other conduits, water softeners and the like, in areas where the water is "hard" that is, contains relatively high quantities of minerals. The carrying capacity of water pipes can be greatly reduced over time, and this phenomenon can cause substantial decrease in water pressure.

The problem of scale formation is particularly aggravated in industrial uses where large volumes of aqueous fluids containing dissolved minerals are handled. For example, scale commonly forms on the surfaces of storage vessels and conveying conduits for process water, and may break loose. These relatively large masses of scale deposits become entrained and ultimately damage and clog equipment such as tubes, valves, filters, screens and pumps. These crystalline scales may detract from the cosmetic appearance of a final product, such as paper products. In more severe cases, scale can clog heat exchange surfaces and thereby form a thermal insulating barrier which inhibits heat transfer efficiency, as well as impeding fluid flow in the system.

In the production and processing of petroleum, scale formation problems are particularly exacerbated by the high levels of dissolved inorganic minerals in the fluids encountered, and by conditions which favor the precipitation and growth of these minerals as scale. For example, injection waters used to pressurize formations often contain dissolved minerals which combine with other dissolved minerals in the formation brine to yield insoluble salts which appear as scale. The mixing of formation brine with water flood fluids can also lead to shifts in ionic strength and pH, which may also cause scale formation. Shifts in temperature and pressure in the near-wellbore region of the formation also cause scale to form.

Prevention and inhibition of scale formation is needed to avoid plugging of the producing formation and production equipment. One of the problems in treating scale is that it can be of many types. The compounds which form scale include, but are not limited to, calcium carbonate, magnesium carbonate, barium sulfate, calcium sulfate, other salts of alkaline earth metals, aluminum silicates, etc. Attempts to prevent or inhibit scale formation are complicated by the wide-ranging chemical and solubility characteristics of the various scale constituents. Often, more than one chemical treatment is used: for example, both acidic and alkaline soaks may be employed to address the variety of scales. Many techniques are known in the art which attempt to address scale prevention or inhibition.

One such method is outlined in U.S. Pat. No. 3,547,817 to Hansen, et al., assigned to Betz Laboratories. In the process of this patent, scale inhibition of an adsorbent is improved through the addition to the formulation of a metal ion. It is broadly stated that the invention applies to "any water soluble, dispersable adsorbents which are normally employed in the adsorption of inorganic contaminants." The adsorbents specifically mentioned and addressed, however, are phosphonic acid derivatives of the general formula:

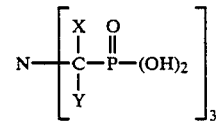

where X and Y are hydrogen or an alkyl group having between one to four carbon atoms, including the ammonium, amine and metal salts of these acids. Metal ions cited as having performance-enhancing effects on scale inhibition are Fe(III), Fe(II), Zn(II), Ni(II), Co(II), Cd(II), Cu(II) and Al(III).

The effectiveness of the U.S. Pat. No. 3,547,817 invention is attributed to the displacement of positive ions, such as Ba(II) for the case of $BaSO_4$ scale, at the surface of the scale crystal by the aforementioned ions. This displacement supposedly changes the electrostatic potential of the surface in such a way so as to allow the adsorption of more inhibitor. Stated another way, the role of the added metal ion is to increase the amount of inhibitor adsorbed at the surface and thereby achieve better inhibition.

The use of nitrilotri(methylenephosphonic) acid (NTMPA) as a scale inhibitor is one example covered by U.S. Pat. No. 3,547,817. The present inventors have observed a small increase in the scale-inhibiting performance of NTMPA in the presence of, for example, Cu(II).

Other phosphonate scale inhibitors also show some extremely modest improvements in performance in the presence of some of the above mentioned metal ions, although Fe(III) and Al(III) have always been observed to have a deleterious effect on performance. Thus, it would be a great advance in the art of scale inhibitors if a material giving something more than a small incremental benefit could be found.

The use of ethylenediaminetetra(methylenephosphonic) acid (ENTMP) and other phosphonic acids alone as scale inhibitors is well known. For example, the following references described the uses of such compounds. (a) U.S. Pat. No. 3,867,286; (b) U.S. Pat. No. 3,792,084, both to Quinlan, which teach this material as a $CaCO_3$ scale inhibitor and as a chelating or sequestering agent of metal ions; however complexes with metal ions are not taught as scale inhibitors; and (c) P. H. Ralston, "Inhibiting Water Formed Deposits with Threshold Compositions," *Materials Performance*, Vol. 11, No. 6, (1972) pp. 39–44, which primarily discusses aminomethylenephosphonate (AMP); 1-hydroxyethylidene-1,1-diphosphonate (HEDP) and amine phosphate (AP).

Metal ion complexes of some of the phosphonic acids described above, including ENTMP, are also known, but not as scale inhibitors. Publications describing these complexes include, but are not limited to: (a) B. Spiess, et al., "Complexing Properties of Nitrilotri(methylenephosphonic) Acid With Various Transition and Heavy Metals in a 10:90 Ethanol-Water Medium," *Polyhedron*, Vol. 6, No. 6, (1987) pp. 1247–1249 (teaches the demetallization of wine); (b) M. T. M. Zaki, et al., "Metal Chelates of Phosphonate-Containing Ligands-IV: Stability of Some 1,6-Hexamethylenediamine-N,N,N',N'-Tetra(methylenephosphonic) Acid Metal Chelates," *Talanta*, Vol. 27, (1980) pp. 709–713; (c) European Pat. No. 186,990 to Christiansen teaching the use of alkyleneaminephosphonic acids together with polyalkylenepolycarboxylic acids as stabilization aids for peroxide systems in the presence of alkaline earth metal ions; (d) U.S. Pat. No. 3,833,486 relating to cyanide-free electroplating, to Nobel, et al.; and (e) European Pat. Document 256,284 A2 where a phosphonate sequestrant synergistically works with a soluble tin compound to extend the storage life of photoresist stripping solutions.

SUMMARY OF THE INVENTION

Accordingly, it is an object of the present invention to provide a scale inhibitor and a method for its use which would prevent or greatly reduce the formation of scale deposits from water or water-bearing systems containing alkaline earth salts, and other dissolved minerals.

It is another object of the present invention to provide a scale inhibitor that is relatively easy to implement in water handling systems exhibiting scaling tendencies.

In carrying out these and other objects of the invention, there is provided, in one form, a method of inhibiting the formation of scale in an aqueous liquid comprising the addition of an effective amount of a phosphonate metal complex molecule, where the phosphonic acid has a formula selected from the group consisting of:

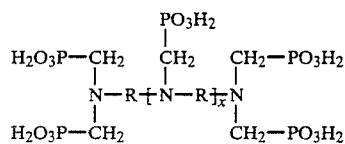

and

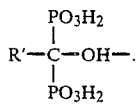

where R' is a straight, branched or cyclic alkyl group and R is a straight, branched or cyclic alkylene group, and both R and R' are of one to eight carbon atoms, where x ranges from zero to four, or the salt thereof and where the metal is a transition metal.

DETAILED DESCRIPTION OF THE INVENTION

The applicants have surprisingly discovered that the complex molecules formed in the reaction of transition metals with phosphonate-type chelators selected from the group of formulae:

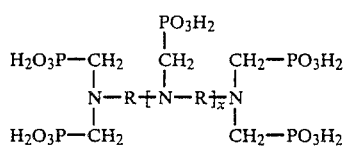

and

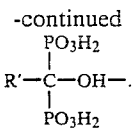

where R' is a straight, branched or cyclic alkyl group and R is a straight, branched or cyclic alkylene group, and both R and R' are of one to eight carbon atoms, where x ranges from zero to four, yield levels of inhibition which are orders of magnitude greater than for any other combination of ligand or metal ion previously tested. The chelator may include the salts of these acids. A particularly extraordinary metal ion complex molecule is formed by the addition of Cu(II) to ethylenediaminetetra(methylenephosphonic) acid (ENTMP).

This unexpected discovery is unrelated to the effects taught in U.S. Pat. No. 3,547,817. The invention of U.S. Pat. No. 3,547,817 concerns a small enhancement in the performance of a scale inhibitor brought about through the presence in the system of a metal ion. The present invention deals with the effectiveness of the actual metal ion complex molecule as a scale inhibitor itself. The fact that a vast, rather than modest, improvement in performance, coupled with an extreme dependence of performance on the particular metal ion used, supports this understanding.

The importance of the complex molecule, rather than the ligand alone, in scale inhibition is highlighted by measurements of the amount of ENTMP adsorbed onto $BaSO_4$ in the presence and absence of Cu(II). Such measurements indicate that Cu(II) does not increase the amount of ENTMP adsorbed. In addition, the amount of Cu(II) adsorbed is virtually equal, on a mole basis, to the amount of ENTMP adsorbed, which strongly suggests that the Cu(II)-ENTMP complex molecule is the adsorbed species. This conclusion implies that the Cu(II)-ENTMP system works by an entirely different mechanism than the one postulated by the teaching of U.S. Pat. No. 3,547,817.

Indeed, it is believed that the Cu(II)-ENTMP complex molecule is the active inhibiting species in the present invention. The binding constant between Cu(II) and ENTMP has been reported to be $1.62 \times 10^{23}$; see R. J. Motekaitis, et al., "Equilibria of Ethylenediamine-N,N,N',N'-tetrakis(methylenephosphonic) Acid with Cu(II), Ni(II), Co(II), Zn(II), Mg(II), Ca(II), and Fe(III) Ions in Aqueous Solution," *Inorganic Chemistry*, Vol. 15, No. 9, 1976, pp. 2303–2306. This value means that Cu(II) and ENTMP will bind quantitatively, i.e., that effectively no dissociated complex exists in solution under the conditions of the invention. In summary, it is believed that Cu(II)-ENTMP is a chemical species capable of inhibiting the formation of $BaSO_4$, and $CaCO_3$ scale to a degree unattainable with inventions disclosed previously, particularly in U.S. Pat. No. 3,547,817.

Metal ion complex molecules of other phosphonic acid have also given improved inhibition, including trans-1,2-diaminocyclohexane-N,N,N',N'-tetra(methylenephosphonic) acid (DCTMP). Additional acids which are within the structural definition above include, but are not limited to diethylenetriaminepenta(-methylenephosphonic) acid, triethylenetetraminehexa(-methylenephosphonic) acid, and hexamethylenediaminetetra(methylenephosphonic) acid. Acids suitable in the method of this invention may be alternatively described as alkyleneamino(alkylphosphonic) acids. As noted the chelators may include the salts of these acids.

The metal ions useful in the method of this invention include, but are not necessarily limited to, copper, cobalt, nickel and zinc; more preferably, copper (II), cobalt (II), nickel (II) and zinc (II). As will be shown in the examples, some of the metals were found to be detrimental when used with the phosphonic acid ligands of this invention, such as Fe(III) and Al(III).

The metal ion complex molecules of the present invention will inhibit or prevent sulfate and carbonate scales from forming, particularly $BaSO_4$ and $CaCO_3$, and it is expected that the complex molecules would be effective against other scales. The effective amount of metal ion complex molecule in an aqueous solution is broadly preferred to be at least 0.001 parts by weight (pbw) for each part by weight of scale forming substance, more preferably at least 0.01 pbw, and most preferably at least 0.1 pbw. It will be appreciated, however, that the necessary minimum thresholds of metal ion complex inhibitor will depend on the nature of the solution to which the inhibitor is being added.

Procedurally, the metal ions are complexed to the phosphonic acids by mixing them together, more preferably followed by adjustment of pH to a value in the range of about 4 to about 8, most preferably followed by adjustment of pH to a value in the range of about 6 to about 7. The pH of the materials may be adjusted using any conventional technique, for example, the pH may be adjusted by adding NaOH or HCl solutions. An effective amount of the metal ion complex molecule is then added to the liquid to be treated. As noted, one skilled in the practice of this invention may need to experiment with what an effective amount is for any given solution. The phosphonate metal complexes of the invention will be further illustrated in the following examples.

EXAMPLES 1–59

Table I is a summary of inhibition results from a static bottle test in which a sulfate-containing brine is mixed with a brine containing barium (II), calcium (II) and a specified amount of a scale inhibitor. Each value is an individually obtained test result: multiple entries indicate repeat runs of the same test. Percent inhibition is based on the initial and final (17 hr.) concentrations of barium (II) in the brine: zero percent inhibition is taken as the concentration of barium (II) remaining in solution for "blank" tests with no inhibitor present. Unless otherwise specified, all testing was conducted at pH 4.0 and 85° C.

The most significant finding is that the addition of a metal ion complex scale inhibitor which is formed by adding 5 ppm of Cu(II) to a 25 ppm brine solution of ENTMP at pH 4.0 resulted in virtually 100% inhibition ($Ba^{2+}:SO_4^{2-} = 1:1$). The inhibitor in examples 3 and 20 yielded respectively, 93% and 99% inhibition. At these conditions, ENTMP alone gave only 10% inhibition, on average (Example 1), and Cu(II) alone did not inhibit scale formation (Example 2). The bottle and solution in Examples 3 and 20 were absolutely clear to the eye. This appears to be a breakthrough discovery since this level of inhibition has been unattainable with every other inhibitor or blend of inhibitors tested, as illustrated in Table I. Cu(II)-ENTMP is a surprisingly effective inhibitor over broad ranges in pH (100% inhibition at pH>4) and temperature (100% inhibition from below 25° C. to above 85° C.).

As shown in Table I, the use of Ni(II) with ENTMP, instead of Cu(II), also resulted in a substantially better performance than ENTMP alone, although 50 ppm of Ni(II) were required (Example 6).

In addition, to Cu(II) and Ni(II), other metals which complex with ENTMP to provide high levels of inhibition include Zn(II) and Co(II), as demonstrated in Examples 7 and 8. Addition of Fe(III) to Cu(II)-ENTMP appears to poison the scale inhibition performance of the complex (Examples 23 and 24).

In addition to ENTMP, other ligands which complex with metal ions to provide high levels of scale inhibition include hydroxyethylidene-1,1-diphosphonic acid (HEDP), (Examples 57 and 58), and DCTMP. The scale inhibition performance of DCTMP improved in the order Co(II)<Zn(II)<Ni(II)<Cu(II); see Examples 38–42.

Only very small enhancements in performance were observed for inhibitors such as nitrilotri(methylenephosphonic) acid (NTMPA); hexamethylenediaminetetra(methylenephosphonic) acid (HNTMP) and diethylenetriaminepenta(methylenephosphonic) acid (DTPMP). Comparisons of the NTMPA data (Examples 50–54) with the ENTMP data (Examples 1–28) dramatically demonstrate the difference in performance between technology covered under U.S. Pat. No. 3,547,817 and the present invention.

TABLE I

| | BaSO$_4$ SCALE INHIBITION IN THE PRESENCE OF ADDED METAL IONS | |
|---|---|---|
| Ex. | Sample | % Inhibition |
| 1 | ENTMP 25 ppm | 7,3,10,16,17,8,9 |
| 2 | Cu(II) 50 ppm | 0 |
| 3 | ENTMP 25 ppm + 5 ppm Cu(II) | 92,93 |
| 4 | ENTMP 25 ppm + 50 ppm Cu(II) | 92 |
| 5 | ENTMP 25 ppm + 5 ppm Ni(II) | 1 |
| 6 | ENTMP 25 ppm + 50 ppm Ni(II) | 50 |
| 7 | ENTMP 25 ppm + 5 ppm Zn(II) | 35 |
| 8 | ENTMP 25 ppm + 5 ppm Co(II) | 23 |
| 9 | ENTMP 25 ppm + 5 ppm Fe(III) | 2,12 |
| 10 | ENTMP 25 ppm + 5 ppm Al(III) | 15,9 |
| 11 | ENTMP 25 ppm + 5 ppm Mo(VI) | 9,13 |
| 12 | ENTMP 10 ppm | 4 |
| 13 | ENTMP 10 ppm + 5.0 ppm Cu(II) | 53 |
| 14 | ENTMP 10 ppm + 4.6 ppm Co(II) | 9 |
| 15 | ENTMP 10 ppm + 4.6 ppm Ni(II) | 17 |
| 16 | ENTMP 10 ppm + 5.1 ppm Zn(II) | 11 |
| 17 | ENTMP 10 ppm + 4.3 ppm Mn(II) | 7 |
| 18 | ENTMP 10 ppm + 4.1 ppm Cr(VI) | 8 |
| 19 | ENTMP 10 ppm + 10.9 ppm La(III) | 5 |
| 20 | Cu(II)-ENTMP (1:1) 25 ppm | 99 |
| 21 | Cu(II)-ENTMP (1:1) 10 ppm | 56 |
| 22 | Cu(II)-ENTMP (1:1) 5 ppm | 22 |
| 23 | Cu(II)-ENTMP (1:1) 25 ppm + 5 ppm Fe(III) | 17,19,15 |
| 24 | Cu(II)-ENTMP (1:1) 10 ppm + 5 ppm Fe(III) | 1 |
| 25 | Cu(II)-ENTMP (1:1) 10 ppm pH 3.3 | 8 |
| 26 | Cu(II)-ENTMP (1:1) 10 ppm pH 5.0 | 97 |
| 27 | Cu(II)-ENTMP (1:1) 10 ppm pH 6.0 | 84 |
| 28 | Cu(II)-ENTMP (1:1) 10 ppm pH 7.0 | 97 |
| 29 | PEHOMP 25 ppm | 46,54,54,31 |
| 30 | PEHOMP 25 ppm + 5 ppm Fe(III) | 6 |
| 31 | PEHOMP 25 ppm + 4 ppm Zr(IV) | 0 |
| 32 | PEHOMP 25 ppm + 7 ppm Al(III) | 0 |
| 33 | PEHOMP 25 ppm + 5 ppm Mo(VI) | 47 |
| 34 | PEHOMP 25 ppm + 5 ppm Cu(II) | 61 |
| 35 | PEHOMP 25 ppm + 50 ppm Cu(II) | 59 |
| 36 | PEHOMP 25 ppm + 5 ppm Ni(II) | 35 |
| 37 | PEHOMP 25 ppm + 50 ppm Ni(II) | 36 |
| 38 | DCTMP 10 ppm | 13 |
| 39 | DCTMP 10 ppm + 5 ppm Cu(II) | 44 |

TABLE I-continued

| BaSO$_4$ SCALE INHIBITION IN THE PRESENCE OF ADDED METAL IONS | | |
|---|---|---|
| Ex. | Sample | % Inhibition |
| 40 | DCTMP 10 ppm + 5 ppm Ni(II) | 35 |
| 41 | DCTMP 10 ppm + 5 ppm Co(II) | 29 |
| 42 | DCTMP 10 ppm + 5 ppm Zn(II) | 30 |
| 43 | DCTMP 10 ppm | 25 |
| 44 | DCTMP 10 ppm + 5 ppm Cu(II) | 17 |
| 45 | DCTMP 10 ppm + 5 ppm Ni(II) | 31 |
| 46 | DCTMP 10 ppm + 5 ppm Co(II) | 30 |
| 47 | DCTMP 10 ppm + 5 ppm Zn(II) | 34 |
| 48 | HNTMP 50 ppm | 5 |
| 49 | HNTMP 50 ppm + 10 ppm Cu(II) | 5 |
| 50 | NTMPA 50 ppm | 5,1 |
| 51 | NTMPA 50 ppm + 10 ppm Cu(II) | 15,7 |
| 52 | NTMPA 50 ppm + 9.2 ppm Ni(II) | 4 |
| 53 | NTMPA 50 ppm + 9.3 ppm Co(II) | 4 |
| 54 | NTMPA 50 ppm + 10.3 ppm Zn(II) | 5 |
| 55 | NTMPA 50 ppm + 8.6 ppm Mn(II) | 1 |
| 56 | NTMPA 50 ppm + 8.2 ppm La(III) | 9 |
| 57 | HEDP 50 ppm | 10,7,5,1 |
| 58 | HEDP 50 ppm + 10 ppm Cu(II) | 42,28 |
| 59 | HEDP 50 ppm + 10 ppm Ni(II) | 1 |

EXAMPLES 60-65

Table II lists inhibition results of Cu(II)-ENTMP for calcium carbonate and calcium sulfate scales, obtained from static bottle tests. The CaCO$_3$ test involved mixing a 200 ppm calcium(II) brine, containing the desired amount of scale inhibitor, with a 310 ppm carbonate brine in the ratio 50:50. The CaSO$_4$ test uses a 7,052 ppm calcium brine, containing the desired amount of scale inhibitor, mixed with a 16,940 ppm sulfate brine, in the ratio 50:50. The samples are then incubated at 85° C. for 24 hours. Percent inhibition is based on the initial and final concentrations of calcium found in the filtered samples of the brine: zero percent inhibition is taken as the concentration of calcium remaining in solution for "blank" test runs with no inhibitor present.

TABLE II

| EFFECT OF Cu(II)-ENTMP ON OTHER MINERAL SCALES | | | |
|---|---|---|---|
| Ex. | Sample | Scale | % Inhibition |
| 60 | Cu(II)-ENTMP (1:1), 5 ppm | CaCO$_3$ | 80.0 |
| 61 | Cu(II)-ENTMP (1:1), 10 ppm | CaCO$_3$ | 99.9 |
| 62 | Cu(II)-ENTMP (1:1), 15 ppm | CaCO$_3$ | 99.9 |
| 63 | Cu(II)-ENTMP (1:1), 5 ppm | CaSO$_4$ | 0.0 |
| 64 | Cu(II)-ENTMP (1:1), 10 ppm | CaSO$_4$ | 43.6 |
| 65 | Cu(II)-ENTMP (1:1), 15 ppm | CaSO$_4$ | 69.6 |

It may thus be seen that the metal ion complex molecules of the present invention provide extraordinary inhibition and even prevention of undesirable scale deposits. Many modifications may be made in the method and compositions of the present invention, which are defined only in the appended claims. For example, one skilled in the art may find that a particular combination of metal ion and phosphonic acid ligand not explicitly recited herein may provide advantageous results.

| GLOSSARY | |
|---|---|
| Cu(II)-ENTMP | A complex of a Cu(II) atom to ENTMP. |
| DCTMP | trans-1,2-diaminocyclohexane-N,N,N',N'-tetra(methylenephosphonic) acid. |
| DTPMP | Diethylenetriaminepenta(methylenephosphonic) acid. |
| ENTMP | Ethylenediaminetetra(methylenephosphonic) acid. |
| HEDP | Hydroxyethylidene-1,1-diphosphonic acid. |
| HNTMP | Hexamethylenediaminetetra(methylenephosphonic) acid. |
| NTMPA | Nitrilotri(methylenephosphonic) acid. |
| PEHOMP | Pentaethylenehexamineocta(methylenephosphonic) acid. |

I claim:

1. A method of inhibiting the formation of scale including barium sulfate in an aqueous liquid having a pH of about 7 or less containing dissolved scale forming substances, comprising the steps of:
adding to the liquid an effective amount of a phosphonate metal complex molecule made by
mixing ethylenediaminetetra(methylenephosphonic) acid (ENTMP) or salt thereof with copper (II) ion to form a Cu-ENTMP phosphonate metal complex molecule, wherein the phosphonate metal complex molecule has a pH and the pH is adjusted to a value in the range of from about 4 to about 8.

2. A method of inhibiting the formation of the scale including barium sulfate in an aqueous liquid having a pH of about 7 or less and containing dissolved scale forming substances, comprising the steps of:
adding to the liquid an effective amount of a phosphonate metal complex molecule made by
mixing ethylenediaminetetra(methylenephosphonic) acid (ENTMP) or salt thereof with a transition metal selected from the group consisting of copper (II), and nickel (II) to form a Cu or Ni ENTMP phosphonate metal complex molecule wherein the phosphonate metal complex molecule has a pH and the pH is adjusted to a value in the range of from about 4 to about 8.

* * * * *